April 15, 1969     H. WUTZEL     3,438,786
CONTINUOUS SPONGE PREPARATION
Filed Aug. 9, 1965
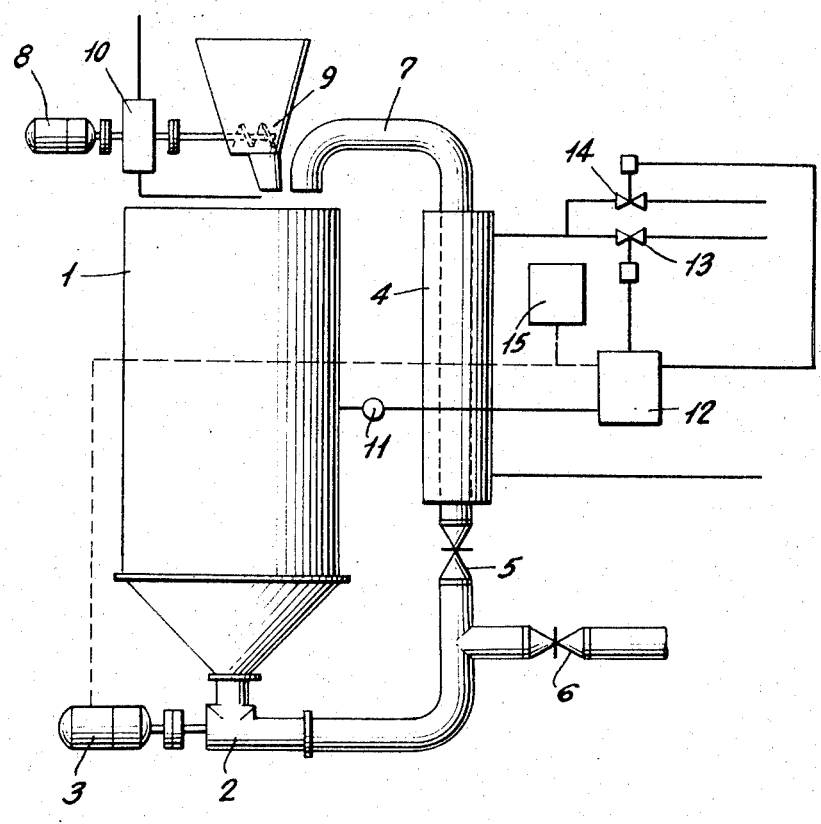
INVENTOR
HERBERT WUTZEL
BY Glascock, Downing + Seebold.
ATTORNEYS United States Patent Office 3,438,786
Patented Apr. 15, 1969

3,438,786
CONTINUOUS SPONGE PREPARATION
Herbert Wutzel, Vienna, Austria, assignor to Patentauswertung Vogelbusch Gesellschaft m.b.H., Vienna, Austria, a company of Austria
Filed Aug. 9, 1965, Ser. No. 478,095
Claims priority, application Austria, Aug. 10, 1964,
A 6,834/64
Int. Cl. A21d 8/02, 8/04
U.S. Cl. 99—90         2 Claims

ABSTRACT OF THE DISCLOSURE

A method of preparing a yeast sponge or the like as a continuous process, comprising preparation of a batch of fermented sponge in a large open fermentation pan without any stirring paddles or the like, withdrawing fermented sponge from the bottom of the pan at a rate of prehaps ten times the rate required for use and returning the remainder of the withdrawn sponge to the top of the pan and simultaneously adding replacement flour, water and leaven at the top of the pan at the rate required to maintain the material within the pan at a constant volume.

---

This invention relates to a method of preparing preliminary dough, known as "sponges," by means of fermentation by bacteria in yeast and/or leaven, wherein the sponge ingredients are supplied evenly to a fermentation pan and part of the sponge is withdrawn from the fermentation pan and returned to same.

As is known, bread-making comprises the following steps: fermentation of the sponge, making of the dough, which includes mixing the dough ingredients and kneading or developing the dough, standing of the dough, also known as "intermediate proofing," dividing and molding of the dough, piece proofing, also known as "final proofing," and baking in the oven.

As above stated, the present invention relates only to the preparing of sponges. The other bread-making operations following this can be carried out in the usual way. By bread is to be understood any kind of bread or bakery product, regardless of whether it is rye or wheat bread, bread made from mixtures of rye and wheat flour, large bread or small bakery products of all kinds.

Methods of bread-making are known which dispense with the sponge fermentation. In these so-called "straight dough processes" instead of part of the flour necessary for the bread-making and part of the necessary water being subjected to a sponge fermentation lasting many hours and often in several stages, before in the subsequent dough-making operation the remainder of the flour and liquid is mixed with additions, such as salt, spices and sometimes sugar, milk and fats, and kneaded, the whole amount of the flour necessary for making the dough is mixed and kneaded with the whole amount of liquid and all additions, whereupon this dough is left to stand. However, such straight dough processes are not really suitable for making rye bread or for making wheat bread using high-gluten flours. These require sponge fermentation on the basis of leaven bacteria or of yeast, as this results in improved flavor and quality of the bread. Moreover increased importance is being attributed to the making of sponges, because it is possible by means of sponge fermentation and intensive kneading of the dough to dispense with the stage of intermediate dough proofing, which is inconvenient and time-consuming particularly in continuous break-making processes.

In the course of introduction of continuous breadmaking processes, conitnuously operating devices and methods for making sponges have been made known. Thus in one known method several fermentation bowls are arranged in a circle on a turntable. Above this arrangement there is special mixing pan, from which the mixed fresh sponge ingredients are discharged successively at intervals into the fermentation bowls below. The speed of rotation of the turn-table is so set that the sponge stage is ready after one complete revolution, which is usually after some hours. Such methods are very time-consuming and require many fermentation bowls to maintain a process, which is at most "continuous in stages" and cannot be termed continuous in the real sense. And lastly, but no less important, such methods are hardly adaptable to eventual modifications in the course of the operation.

The silo method—a method of making sponges on the basis of bacterial fermentation by means of leaven—which is also already known, constitutes an improvement on the above-mentioned method, insofar as the number of pans required is smaller. In this method the fresh sponge ingredients are mixed constantly with the ripening sponge in one or more fermentation bowls by stirring blades. However, the sponge must be thin, that is, the proportion of flour must be kept low and the proportion of liquid high. This sets limits on the usability of such plants, because as a rule sponges of firm consistency are to be preferred. Moreover the fermentation bowls used in this method have to be provided with a double jacket or with pockets for warming or cooling in order to be able to maintain the required temperature conditions.

Finally methods have become known, in which the mixing of the sponge ingredients takes place outside the fermentation device and the mixture is conveyed through the fermentation device by conveying means arranged outside or inside the latter or by the pressure arising during fermentation. Such a fermentation device may consist of one or more fermentation bowls or one or more fermentation pipes. It is common to all such methods that the sponge conveyed through the fermentation device is in a different state of ripeness—ranging from unripe to fully ripe—in each cross-section. The particular disadvantage of these methods is therefore to be seen in that a uniform state of ripeness cannot be achieved and maintained in the fermentation device.

The disadvantages innate in the known methods of preparing sponges are removed according to the invention by the feature that, in order to obtain a uniform state of ripeness in the fermentation pan, the sponge is returned to the pan at intervals or continuously with simultaneous removal of the fermented sponge at a delivery rate, expressed in kilograms per hour, of at least five times, preferably ten times, the regular feed of fresh sponge ingredients.

For obtaining rapidly a uniform state of ripeness throughout the entire contents of the fermentation pan, it has proved expedient in periodic operation to keep the quantity of sponge returned during the regular feed of fresh sponge ingredients approximately equal to the quantity of said ingredients supplied. In contradistinction thereto it has proved expedient in continuous operation to effect the return of the sponge in dependence on the quantity removed, which is in turn again dependent on the quantity of fresh ingredients continuously and evenly supplied. The method according to the invention surprisingly conforms to what is expedient for both periodic and continuous operation. That is, if the delivery (kg./h.) in periodic operation were less than five times the regular feed of fresh sponge ingredients, the blending time necessary to obtain a uniform state of ripeness would be inadmissibly long, while in continuous operation the sponge removed would have an uneven degree of ripeness with the said lower delivery rate. Both the disadvantage relating to periodic operation and that relating to continuous operation are fully obviated by the rule laid down in the present invention. The method according to the invention is thus just as suitable for periodic as for continuous operation, which offers the important advantage that conversions from periodic to continuous sponge fermentation, or vice-versa, as well as changeovers during one and the same mode of operation, can be carried out very easily. The present method is at the same time not very expensive in installation, as only a single fermentation pan is required to carry it out. This pan may be free of inner attachments, so that hygienic conditions are also fulfilled. The simultaneous or successive sequence of return and removal of the sponge makes it possible to carry out the method at any desired site in the bakery without additional devices or pans being required.

Some examples of performing the present method are described in more detail hereunder with reference to the single figure of the accompanying drawing, which shows a device suitable for carrying the method into effect.

1 is the fermentation pan, 2 is the pump which is driven by a controllable motor 3. There is also a return pipe 7 provided with a warming or cooling device 4, a return valve 5 and a withdrawal valve 6, as well as two feed devices 9 and 10 driven by a motor 8 and adapted to feed the flour and water evenly. An adjustable contact thermometer 11 makes possible through a switching relay 12 the actuation of a cold water valve 13 or a hot water valve 14, the pump 2 being set in operation by the motor 3 at the same time. Furthermore a time switch 15 controls the periodic setting in operation of the pump motor 3. The necessary electrical switching members are not shown in the drawing.

EXAMPLE 1

10 kg. ripened leaven is placed as seed material in the 200 l. capacity fermentation pan 1, to the conical outlet of which the pump 2 is connected. At the beginning of the sponge-preparing operation 50 kg. rye flour and 50 l. water are fed evenly into the fermentation pan 1 over a period of 6 minutes via the adjustable inlet devices 9, 10, while at the same time, with the return valve 5 open and the withdrawal valve 6 closed, the pump 2 returns the sponge through the return pipe 7 into the upper part of the pan 1 at a delivery rate of 1000 kg./h. 6 minutes after termination of the feed of fresh sponge ingredients, that is 12 minutes after the beginning of the feed, the pump 2 is switched off. With the aid of the contact thermometer 11 a fermentation temperature of 30° C. is instituted in the fermentation pan 1 by means of the switching relay 12 and the hot water valve 14. During the subsequent 15-hour fermentation period the pump 2 is set in operation hourly for six minutes by the time switch 15.

On completion of the sponge fermentation the return valve 5 in the return pipe 7 is closed and the discharge valve 6 opened, whereupon 100 kg. ripened sponge are conveyed by the pump to a mixing and kneading device in six minutes. Approximately 10 kg. ripe sponge remain in the pan 1 as seed material for the following charge.

The sponge ripened by this method can then be mixed and kneaded in the mixing and kneading device, in a manner known per se, with 75 kg. rye flour, 31 liters water, 2 kg. common salt and 2 kg. yeast. The finished dough is divided and molded. After 60 minutes piece proofing the rye bread can be baked.

EXAMPLE 2

75 kg. wheat flour and 75 l. water, in which 5 kg. yeast have been dissolved, are introduced evenly into the fermentation pan 1 via the adjustable feed devices 9, 10 in 9 minutes. Directly after the commencement of the feed of these fresh sponge ingredients the pump 2 is switched on and returns fresh sponge through the return pipe 7, with the return valve 5 open and the discharge valve 6 closed, into the upper part of the fermentation pan 1, at a delivery rate of 1000 kg./h. 9 minutes after termination of the feed of fresh sponge ingredients, that is, 18 minutes after beginning of the feed, the pump 2 is switched off. By means of the contact thermometer 11 a fermentation temperature of 22° C. is set up in the pan 1 through the switching relay 12 and the cold water valve 13. During the following 10-hour fermentation period the pump 2 is set in operation hourly for 9 minutes by the time switch 15.

On completion of the sponge fermentation, the entire quantity of ripe sponge can then, in the manner described in Example 1, be conveyed in 9 minutes to a mixing and kneading device. There 100 kg. wheat flour, 21.5 l. water and 2.8 kg. common salt can be added. The finished dough is immediately divided and molded. After 40 minutes piece proofing the wheat bread can be baked.

EXAMPLE 3

The preparing of the initial charge for continuous sponge fermentation takes place by means of periodic sponge fermentation in the manner described in Example 1. 85 kg. rye flour and 65 l. water are introduced evenly into the fermentation pan 1, in which 17 kg. ripened leaven have been placed as seed material, via the adjustable feed devices 9, 10 in 10 minutes. The pump 2 switched on at the beginning of the feed of fresh sponge ingredients returns sponge to the upper part of the pan 1 at a delivery rate of 1000 kg./h., in the manner described in Example 1. The fermentation temperature is set at 30° C. 10 minutes after the end of the feed of fresh sponge ingredients, that is 20 minutes after the beginning of the feed, the pump 2 is switched off. During the following 15-hour periodic sponge fermentation the pump 2 is set in operation hourly for 10 minutes by the time switch 15.

Only on completion of this periodic sponge fermentation does the actual continuous sponge fermentation begin. For this purpose the adjustable feed devices 9, 10 are set so that an even feed of 31 kg. rye flour and 24 l. water takes place hourly. 0.6 kg. leaven bacteria having a dry substance content of approximately 30% are supplied hourly to the fermentation pan 1, dissolved in the water, in a manner known per se. The return valve 5 is throttled to such an extent and the discharge valve so far opened that with a pump delivery of 1000 kg./h., 55 kg. ripe sponge are constantly conveyed hourly to the mixing and kneading device. During the continuous sponge fermentation the fermentation temperature is set at 35° C.

In a continuously operating mixing and kneading device 46 kg. rye flour and 26 l. water, with 1.4 kg. yeast and 1.4 kg. salt, can then be constantly added hourly to the ripe sponge. The constantly kneaded dough is divided and molded continuously. The individual articles of dough can continually be left to proof for 60 minutes and then baked.

In this way the process continues without interruption, for 12 hours, for example. After this period the feed of fresh sponge ingredients is stopped and the discharge valve 6 opened to such an extent that for a further hour 150 kg. ripe sponge are conveyed to the mixing and kneading device. The rye bread can be made in the manner already described after continuous addition of 127 kg. rye flour, 73 l. water, 3.8 common salt and 3.8 yeast. 17 kg. ripe leaven remain as seed material in the fermentation pan.

EXAMPLE 4

The preparing of sponge according to the invention on the basis of leaven bacteria ferementation is carried out by means of continuous sponge fermentation in principle as in Example 3, only with the modification that by means of the adjustable motor 3 associated with the pump 2, the delivery of the pump 2 is adjusted to 500 kg./h. at the beginning of the actual continuous sponge fermentation process and this output is maintained until the fermentation pan 1 is emptied.

EXAMPLE 5

The preparing of the initial charge for continuous sponge fermentation takes place by means of periodic sponge fermentation in the manner described in Example 1. 50 kg. wheat flour and 50 l. water, in which 3.6 kg. yeast have been dissolved, are introduced evenly into the fermentation pan 1 via the adjustable feed devices 9, 10 in 6 minutes. The pump 2 switched on immediately after the start of the feed of fresh sponge ingredients returns sponge to the upper part of the pan 1 at a delivery rate of 1000 kg./h., in the manner described in Example 1. The fermentation temperature is set at 22° C. 6 minutes after the end of the feed of fresh sponge ingredients the pump 2 is switched off. During the following 10-hour periodic sponge fermentation it is set in operation hourly for 6 minutes by the time switch 15.

Only on completion of this periodic sponge fermentation does the actual continuous sponge fermentation begin, in the present example according to a preset working programme in several stages. The fermentation temperature is set at 24° C. during the continuous sponge fermentation. For a period of 5 hours 50 kg. wheat flour and 50 l. water, in which 6 kg. yeast have been dissolved, are fed hourly via the adjustable feed devices 8, 10, in the manner described in Example 3, while by suitable setting of the valves 5 and 6, with a 1000 kg./h. delivery by the pump 2, 100 kg. ripe sponge are constantly conveyed hourly to the continuously operating mixing and kneading device. After constant addition of 75 kg. wheat flour, 19 l. water and 2 kg. common salt per hour to the yield of 100 kg. sponge, the bread-making, in this case wheat bread, can be carried out in the manner described in Example 3, the final proofing being 40 minutes.

A smooth transition to a method of operation comprising reduced removal of ripe sponge is now made without interruption. For this purpose the uniform feed of 50 kg. wheat flour and 50 l. water per hour is maintained for 2 hours, but with a reduced yeast addition of 3.8 kg./h. By adjusting the valves 5 and 6 the quantity of sponge removed is reduced to 75 kg./h. The delivery of the pump 2 is 1000 kg./h.

Then for 5 hours, with a constant removal of 75 kg. sponge per hour and pump delivery of 1000 kg./h., the feed of flour and water is set at 37.5 kg./h. each per hour. The yeast addition during this period is 2.8 kg./h.

During the subsequent continuous running out stage, the quantity of sponge removed remains at 75 kg./h., while the uniform feed of flour and water is adjusted to 25 kg./h. each and the yeast addition to 2 kg. By means of the adjustable motor 3 the delivery of the pump 2 is adjusted to 500 kg./h. Whereas the feed ends after 5 hours, the ripe sponge is conveyed to the continuously operating mixing and kneading device for approximately 5⅓ hours. There, after addition of 56.5 kg. wheat flour, 14.5 l. water and 1.5 kg. common salt per hour, the wheat bread can be made in the above-described manner, as known.

I claim:

1. A method of preparing preliminary dough, known as sponge, by means of fermentation with yeast or bacteria in leaven, wherein a ripe sponge is prepared in a fermentation pan, after which sponge is removed from the bottom of the fermentation pan at a constant rate for subsequent processing and unfermented sponge ingredients are added to the top of the fermentation pan at the same rate as sponge for subsequent processing is removed from the bottom of the fermentation pan, and an additional amount of sponge is continuously removed from the bottom of the fermentation pan at a rate of at least five times the rate of removal of sponge for subsequent processing, said additional amount of sponge being continuously returned to the top of said fermentation pan.

2. The method of claim 1 in which the rate of removal and return of said additional amount of sponge is in excess of ten times the rate of the constant rate of removal of sponge for subsequent processing.

References Cited

FOREIGN PATENTS 684,530  4/1964  Canada.

OTHER REFERENCES

Steel: "Biochemical Engineering," 1958, Heywood & Co., Ltd., London, page 218.

De Becze et al.: "Continuous Fermentation," American Brewer, February 1943, pages 11, 12, 30.

Pelshenke: "Some Fermentative Aspects of Continuous Mixing," The Bakers Digest, page 28.

LIONEL M. SHAPIRO, *Primary Examiner.*